April 8, 1958
D. R. PEDRICK
2,829,440
ATTACHMENT FOR GAUGES
Filed April 23, 1956
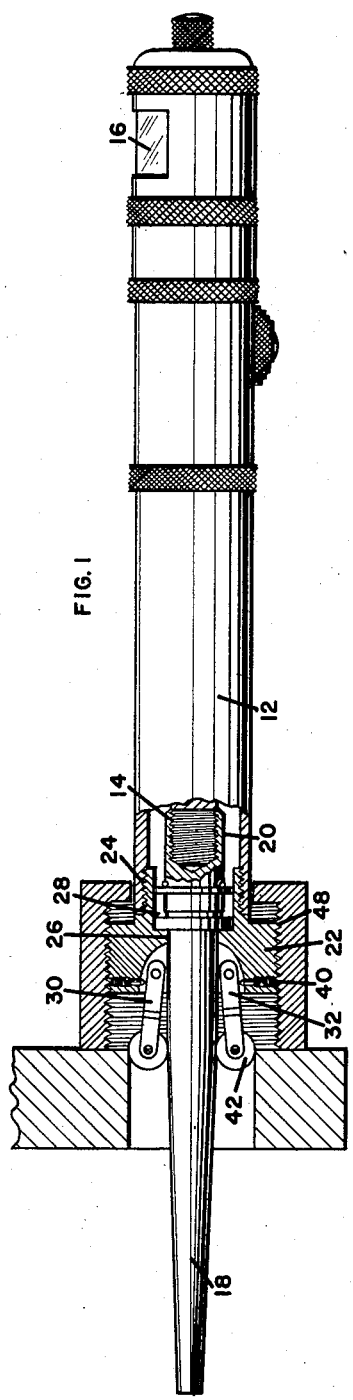
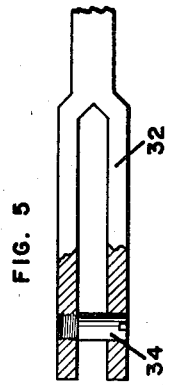
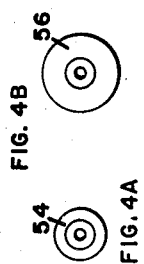
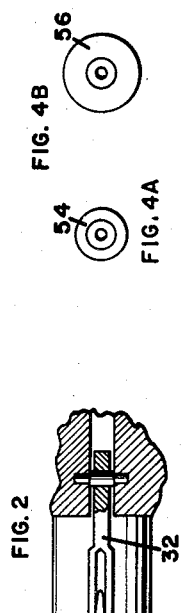
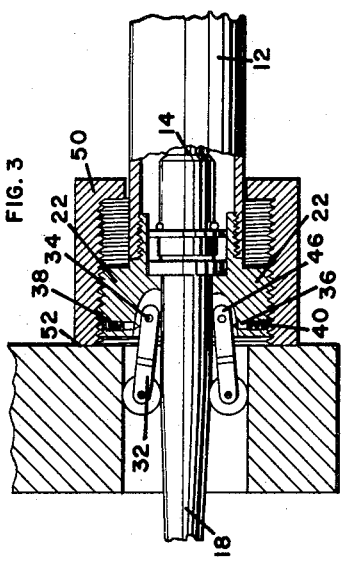
INVENTOR
Donald R. Pedrick
BY
ATTORNEY

United States Patent Office 2,829,440
Patented Apr. 8, 1958

2,829,440

ATTACHMENT FOR GAUGES

Donald R. Pedrick, Shoemakersville, Pa., assignor to Hamilton Watch Company, Lancaster, Pa., a corporation of Pennsylvania Application April 23, 1956, Serial No. 579,888

7 Claims. (Cl. 33—178)

This invention relates to an improvement in gauges and more particularly that type of gauge having a longitudinally moveable tapered pin for measuring hole diameters.

This invention is an improvement on Application Serial No. 409,849, now Patent No. 2,786,277 issued on March 26, 1957, to M. F. Zifferer, and a companion case Serial No. 569,540.

In that type of gauge in which a tapered rod is inserted into a hole to measure the diameter of that hole, it sometimes happens that the measurement is made at the edge of the hole where a slight chamfer or a burr may give a distorted reading. With this type of gauge it is impossible to go beyond the edge of the hole unless some additional fixture is attached to the gauge, such as that shown in the patent application Serial No. 569,540. It is also true that such gauges are limited between a minimum measurement and a maximum measurement of about ¼ of an inch.

The object of this invention is to provide an attachment for that type of gauge having a movable tapered rod for measuring the diameter of holes, wherein the measurement is made either at the edge of the hole or at a certain desired distance below the edge and well within the hole.

It is a further object of the present invention to provide a pair of rollers which may be inserted between the gauge and the edge of the hole, and to provide means for changing the size of the rollers so that the range of the gauge is extended.

It is a further object of the present invention to provide a pair of pivoted rollers of equal diameter adapted to be swung into gauge contacting position and to be inserted within the hole, movement of the gauge forcing said rollers into contact with the side of the hole, the measurement being taken by adding twice the diameter of one of the rollers to the measurement provided by the tapered rod.

It is a further object of the present invention to provide a series of rollers of different sizes which may be interchanged to provide a greater range through which the gauge may be used.

The invention is shown in the accompanying drawing in which:

Figure 1 is a longitudinal view partly in section of the gauge forming the subject of the invention.

Figure 2 is a partial top plan view of the gauge shown in Figure 1.

Figure 3 is a detail view similar to Figure 1 showing the operation of the rollers.

Figures 4A and 4B show different size rollers.

Figure 5 shows a detail of the roller carrying fork.

A gauge having a housing 12 for a spindle 14, carrying indicia which are read through a window 16, is provided with a tapered rod 18 which is threaded at 20 to the end of said spindle. A head 22 is threaded at 24 to the end of the housing 12 and is formed with a central opening 26 which is enlarged to provide a cylindrical well 28 for the reception of the threaded end of the tapered rod, and an opposite semispherical hollowed portion 30 in which are housed a pair of forks 32. The forks are pivotally mounted in the walls of the head by pivot pins 34 and are urged toward each other by pins 36. The pins 36 are carried in holes in the head 22 and are urged against the forks 32 by coil springs 38 adjustably held in position by screws 40.

Interchangeable rollers 42 are secured between the ends of the forks by screw threaded pins 44. These rollers are tapered toward their periphery and have their rims rounded, as shown at 46, to provide point contact with the side of the hole being measured.

The head 22 is formed with outside threads 48 on which a sleeve 50 is mounted. This sleeve is adjustable on the head 22 to regulate the distance the rollers penetrate into the hole being measured.

Referring to Figures 4 and 5, rollers of different diameter, such as 54 and 56, are shown. These rollers are interchangeably mounted in the forks 32 by removing the pin 34 from the forks and replacing one roller with the other. It would be desirable to make these rollers in measurements which would conform to the indicia carried on the spindle so that easy reading of the gauge could be made by simply adding to the reading of the spindle a unit equal to twice the diameter of the rollers. Thus, the range over which the gauge may be used may be increased and the same gauge may be used with different pairs of rollers to extend the usefulness of the gauge.

What is claimed is:

1. An attachment for a gauge of the type having a longitudinally movable tapered rod for measuring hole diameters comprising, a housing for said tapered rod, a removable head threadly supported by said housing and formed with a central bore receiving said tapered rod, said bore being enlarged into a semispherical hollow portion, a pair of forks pivotally mounted in the side of said hollow portion, rollers of equal diameter carried in each of said forks and adapted to be positioned on diametrically opposite sides of said tapered rod to simultaneously contact said rod and the side of said hole during the measuring operation.

2. An attachment for a gauge according to claim 1, wherein means are provided for limiting the penetration of said rollers into the hole being measured.

3. An attachment for a gauge according to claim 1, wherein a sleeve threaded to said head limits the depth of penetration of said rollers into the hole being measured.

4. An attachment for a gauge according to claim 1, wherein the rollers are tapered from the center towards their periphery.

5. An attachment for a gauge according to claim 1, wherein the rollers are tapered from their center to their periphery and their rims rounded to provide substantially point contact between the rollers and the side of the hole being measured.

6. An attachment for a gauge of the type having a longitudinally movable tapered rod for measuring hole diameters comprisinng, a housing, a spindle mounted for longitudinal movement within said housing, said spindle carrying indicia readable through a window in said housing, said tapered rod being secured to one end of said spindle, a head threaded to the end of the said housing and formed with a longitudinal bore for passage of said tapered rod, the bore of said head being enlarged at one end to a semispherical hollow portion, a pair of forks pivotally mounted in the side of said hollow portion, rollers of equal size mounted in each of said forks, said rollers being tapered from their center portion to their periphery, their rims being rounded to provide substantially point contact between said rollers and the edge of said hole being measured, said forks being mounted in said head so as to position said rollers diametrically opposite each other on said tapered rod, and means for urging said rollers at all times toward said tapered rod.

7. An attachment for a gauge according to claim 6, wherein said rollers of equal size are interchangeable with a second pair of rollers of equal but different size from said first mentioned rollers.

References Cited in the file of this patent
UNITED STATES PATENTS

| | | |
|---|---|---|
| 1,008,842 | Mair | Nov. 14, 1911 |
| 1,631,019 | Darlington | May 31, 1927 |
| 2,642,672 | Lewis et al. | June 23, 1953 |